(12) United States Patent
Kaltenegger et al.

(10) Patent No.: US 7,605,569 B2
(45) Date of Patent: Oct. 20, 2009

(54) ACQUISITION CIRCUIT AND CONTROLLER CIRCUIT FOR AN ALTERNATOR

(75) Inventors: Martin Kaltenegger, Graz (AT); Alexander Mori, Graz (AT)

(73) Assignee: Infineon Technologies AG, Munich (DE)

( * ) Notice: Subject to any disclaimer, the term of this patent is extended or adjusted under 35 U.S.C. 154(b) by 226 days.

(21) Appl. No.: 11/669,640

(22) Filed: Jan. 31, 2007

(65) Prior Publication Data
US 2008/0180068 A1    Jul. 31, 2008

(51) Int. Cl.
H02P 11/00 (2006.01)
H02H 7/06 (2006.01)
H02P 9/00 (2006.01)

(52) U.S. Cl. .......................................... 322/24; 322/37
(58) Field of Classification Search .................... 322/24, 322/37
See application file for complete search history.

(56) References Cited

U.S. PATENT DOCUMENTS

| | | | |
|---|---|---|---|
| 4,794,898 A | 1/1989 | Kato | 123/339 |
| 5,182,511 A | 1/1993 | Pierret et al. | 324/545 |
| 5,602,470 A | 2/1997 | Kohl et al. | 324/177 |
| 6,147,474 A | 11/2000 | Koss et al. | 322/59 |
| 6,631,166 B1 * | 10/2003 | Carroll | 375/259 |
| 6,803,747 B2 | 10/2004 | Taniguchi et al. | 322/28 |
| 6,806,727 B2 * | 10/2004 | Thibedeau et al. | 324/772 |
| 6,912,142 B2 | 6/2005 | Keim et al. | 363/89 |
| 2006/0047408 A1 * | 3/2006 | Kayser | 701/114 |

FOREIGN PATENT DOCUMENTS

| | | |
|---|---|---|
| DE | 3308824 C2 | 9/1984 |
| DE | 690 01 216 T2 | 7/1993 |
| DE | 43 27 485 B4 | 10/2005 |
| EP | 0 193 335 A2 | 9/1986 |
| EP | 0 048 436 B1 | 3/1993 |
| EP | 0 577 994 B1 | 5/1997 |
| EP | 0 664 887 B1 | 6/1998 |
| EP | 0 726 633 B1 | 9/2000 |
| EP | 1 204 200 A2 | 5/2002 |
| WO | 95/05606 A1 | 2/1995 |
| WO | 99/07064 A1 | 2/1999 |

* cited by examiner

Primary Examiner—Nicholas Ponomarenko
Assistant Examiner—Pedro J Cuevas
(74) Attorney, Agent, or Firm—Eschweiler & Associates, LLC

(57) ABSTRACT

An acquisition circuit for providing a first and a second validation signal based on an alternator output signal has a coupler being adapted for receiving the alternator output signal and for providing a coupling signal having information on the phase of the alternator output signal, the coupler having a capacitive element for coupling the alternator output signal and the coupling signal, the coupler having a resistive element for coupling the coupling signal and a reference signal. The acquisition circuit further has a detector adapted for receiving the coupling signal and for providing the first and second validation signals, wherein the relation between the validation signals is based on the information on the phase of the output signal, wherein the frequency of the alternator output signal is derivable from the validation signals and the validity information is derivable from the relation between the validation signals.

22 Claims, 8 Drawing Sheets

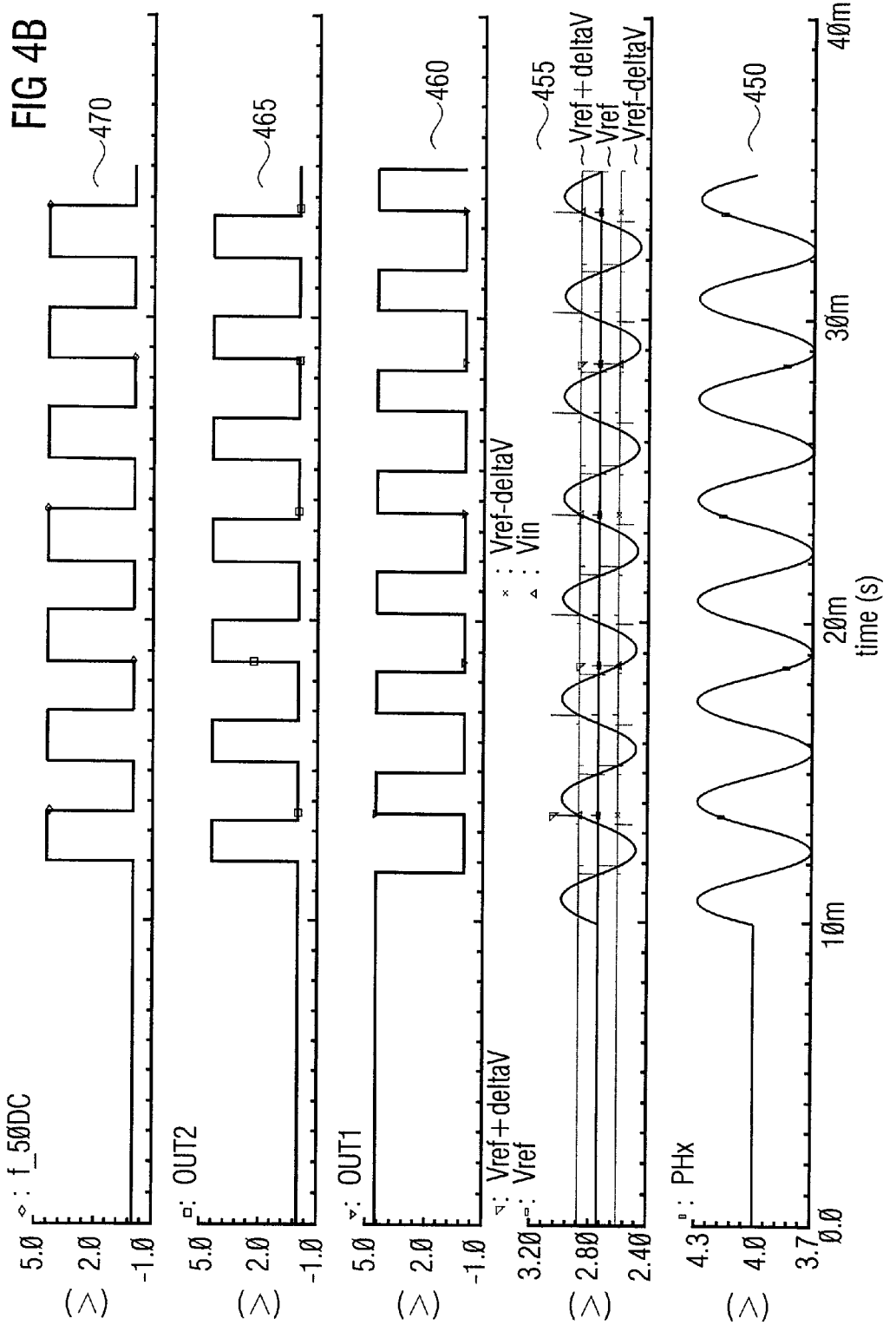

ACQUISITION CIRCUIT AND CONTROLLER CIRCUIT FOR AN ALTERNATOR

TECHNICAL FIELD

The present invention relates to the field of acquisition and controller circuits as they are used in automotive systems for alternators, where an excitation current needs to be controlled in dependence on the status of a combustion engine.

BACKGROUND

In automotive systems an alternator is driven by a combustion engine in order to provide electrical power. Modern systems make use of integrated circuits for regulating alternator output voltages. Basically the behavior of a regulator depends on the output voltage but also takes into account the status of the engine. The speed of the engine is an important indicator. Especially during the start up phase and also in low speed conditions, measurements of the engine's speed are of high interest. These measurements can be carried out either with external sensors or by using phase signals often obtained directly from the alternator. External sensors are accurate but very expensive, so preferred solutions are implemented in an on-chip fashion detecting the phase signals.

Conventional systems often suffer from the disadvantageous accuracy that is achieved with the on-chip solutions. Other conventional systems achieve higher accuracy, however at the price of high reaction times, so conventional controller systems are too slow to achieve an efficient control of the excitation current of an alternator and the alternator output voltage.

SUMMARY

According to an embodiment an acquisition circuit may provide a first and a second validation signal based on an alternator output signal. The acquisition circuit may comprise a circuit for coupling being adapted for receiving the alternator output signal and for providing a coupling signal having information on the phase of the alternator output signal, the circuit for coupling having a capacitive element for coupling the alternator output signal and the coupling signal, the circuit for coupling further having a resistive element for coupling the coupling signal and a reference signal. The acquisition circuit further may comprise a circuit for detecting being adapted for receiving the coupling signal and for providing the first and second validation signals, wherein the relation between the first and the second validation signals is based on the information on the phase of the output signal, wherein the frequency of the alternator output signal is derivable from the first or second validation signals and a validity information is derivable from the relation between the first and the second validation signals.

BRIEF DESCRIPTION OF THE DRAWINGS

Preferred embodiments are described in the following with the help of the accompanying figures, in which

FIG. 4b shows view graphs of signals in an embodiment;

DETAILED DESCRIPTION

Figure 1A:
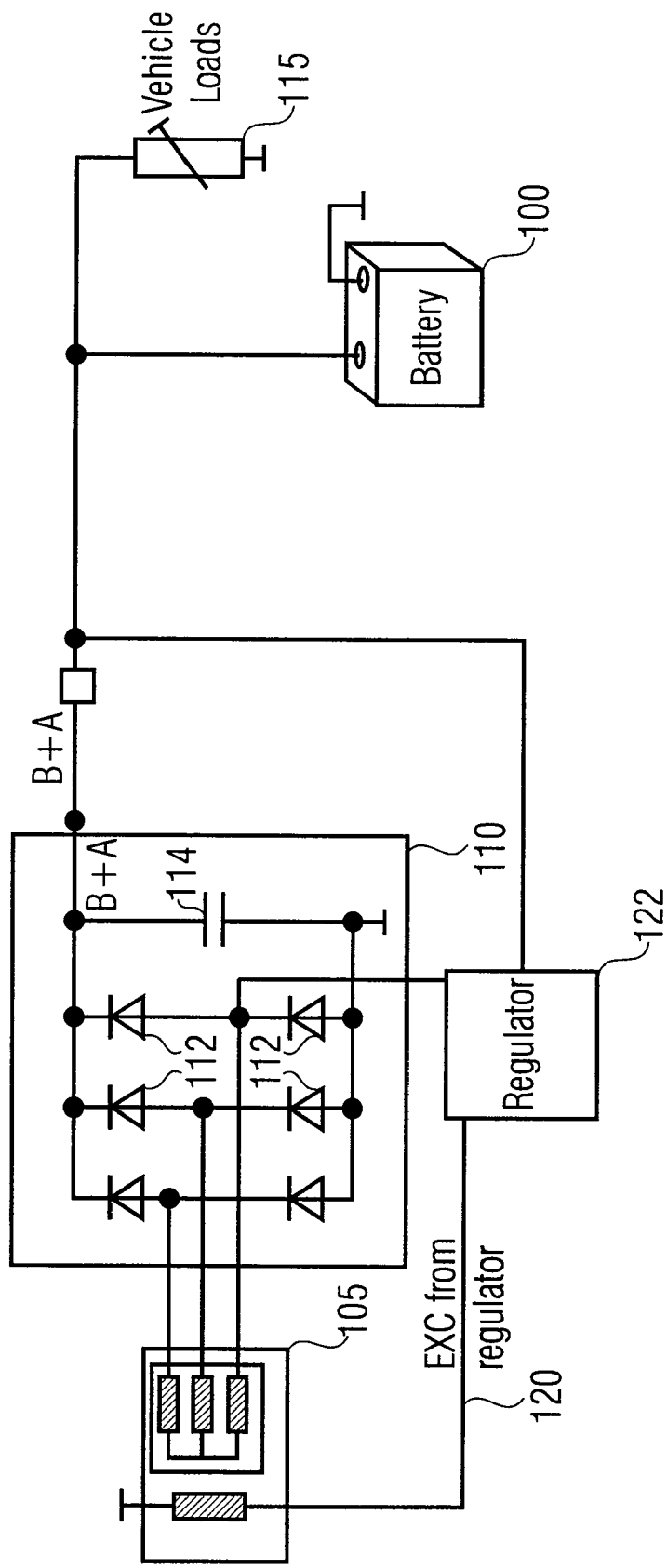
FIG. 1a illustrates the principle of an alternator control circuit.

FIG. 1a shows a basic circuit as it is used in a conventional automotive controller circuit. FIG. 1a shows a battery 100, an alternator 105, a rectification circuit 110, which is realized with multiple diodes 112 and a capacitor 114. FIG. 1a further shows vehicle loads 115 as well as a connection 120 to an excitation signal, which can be provided by a regulator 122. In FIG. 1a the regulator 122 provides the excitation signal based on an alternator output or phase signal and a signal obtained at the battery 100. The type of construction of the alternator 105 in FIG. 1a is an externally excited three phase generator with a three phase full wave rectification 110. The output is buffered by the 12 volt battery 100 of the vehicle. Normally a stator with three phases is in star point configuration but also triangle configuration is possible. In both configurations there is no relation between the phase signals and ground until the voltage between two phases is higher than the battery voltage plus the voltage drop across the diodes 112 of the rectification bridge 110. For a small AC phase voltages the rectification bridge 110 is a high-ohmic node.

The worst case for speed detection is the start up period of the engine. During the start up period there is no excitation, only the remanence of the rotor induces small voltages into the alternator windings, which leads in combination with the low speed to a very low AC voltage. Due to the high-ohmic node impedance, as it was explained with the help of FIG. 1a, the DC level is determined only by parasitic effects like leakage currents of the diodes 112. Moreover, capacitive coupling has an influence on the AC signal.

Conventional systems, as an example is depicted in FIG. 1a, do not make use of capacitive coupling, due to the effect of small signal amplitudes and low frequencies during the critical start up period. To achieve signal amplitudes high enough for proper detection, there is a need for large capacitors in conventional systems. Solutions utilizing large capacitors are not feasible for integrated circuits. The only way to reduce the size of such a capacitor is to implement a detection circuit with an input resistance as high as possible. The main advantage of capacitive coupling circuits is that the operation point can be defined independently of the signal source. The two requirements high input resistance and well defined operation point are contradictory. Additionally, it can be disadvantageous that there is no suppression of un-correlated disturbances.

Figure 1B:
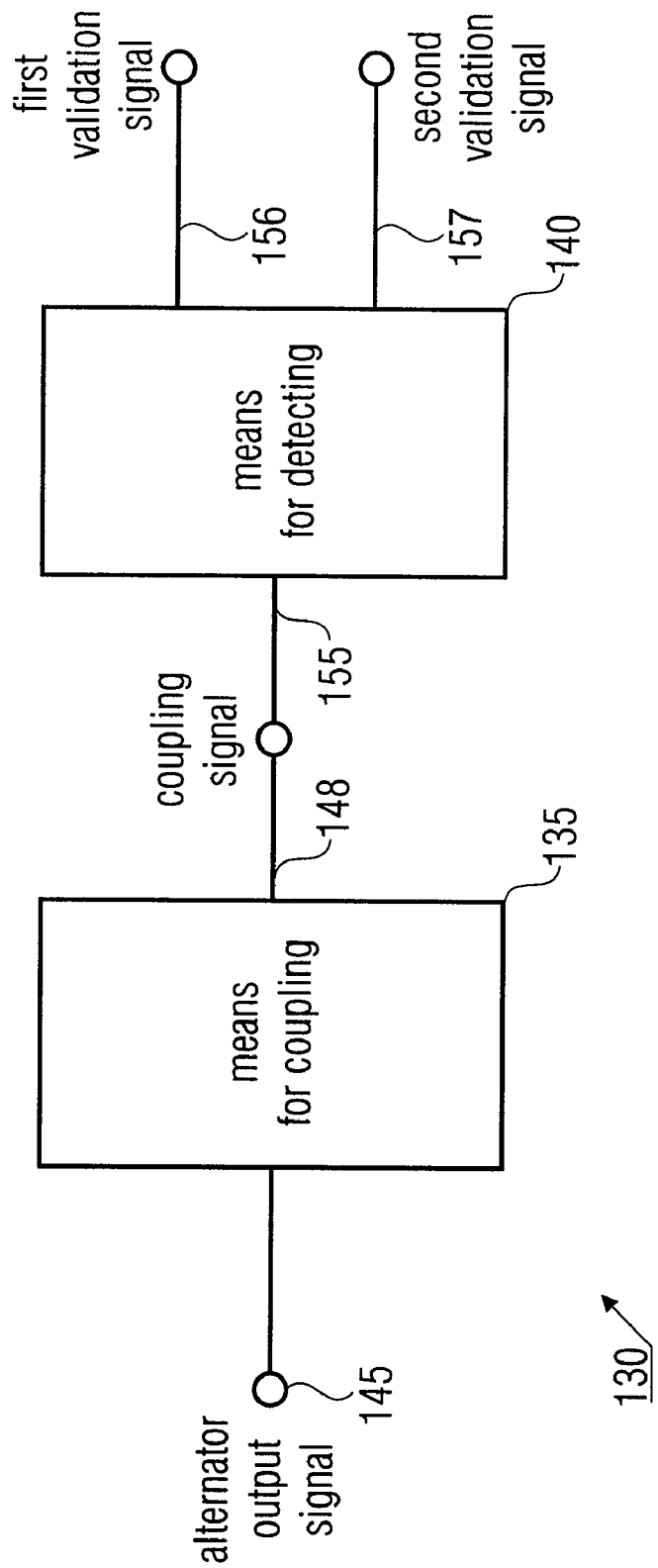
FIG. 1b depicts an embodiment of an acquisition circuit.

FIG. 1b shows an embodiment of an acquisition circuit 130 for providing a first and a second validation signal based on an alternator output signal. The acquisition circuit 130 comprises a circuit 135 for coupling being adapted for receiving the alternator output signal and for providing a coupling signal having information on the phase of the alternator output signal, the circuit 135 for coupling having a capacitive element for coupling the alternator output signal and the coupling signal, the circuit 135 for coupling further having a resistive element for coupling the coupling signal and a reference signal. The acquisition circuit 130 further comprises a circuit 140 for detecting being adapted for receiving a coupling signal and for providing the first and the second validation signals, wherein the relation between the first and the second validation signals is based on the information on the phase of the output signal, wherein the frequency of the alternator output signal is derivable from the first or second validation signal and the validity information is derivable from the relation between the first and the second validation signals.

In one embodiment the capacitive element comprises a capacitor with a capacity of less than 10 nF, in a preferred embodiment the capacity of the capacitor is in the range of 10 pF. In another embodiment, the capacitive element is coupled to an input of a comparator. The resistive element can comprise a resistor with an ohmic resistance higher than 1 GΩ. In other embodiments, the resistive element comprises a diode, in yet an other embodiment the resistive element can comprise two anti-parallel diodes. The two anti-parallel diodes can also be realized using a transistor structure, where in one embodiment field effect transistors are used.

The circuit 140 for detecting may comprise a comparator in one embodiment. In another embodiment the circuit 140 for detecting comprises a window comparator with thresholds related to the reference signal. In yet another embodiment the window comparator has symmetrical thresholds related to the reference signal. In one embodiment the reference signal can be a DC signal, in a preferred embodiment the range of the reference signal is between 0V and 5V.

According to FIG. 1b, the acquisition circuit comprises the circuit 135 for coupling, which can be realized as a coupler with an input 145 for an alternator output signal and an output 148 for a coupling signal. The input 145 for the alternator output signal can be coupled with the output 148 for the coupling signal with a capacitor, the output 148 for the coupling signal can be further coupled to a reference signal with a resistive element. Furthermore, the circuit for detecting 140 can be realized by a detector circuit with an input 155 being coupled with the output 148 for the coupling signal and with a first output 156 for the first validation signal and a second output 157 for the second validation signal.

Figure 1C:
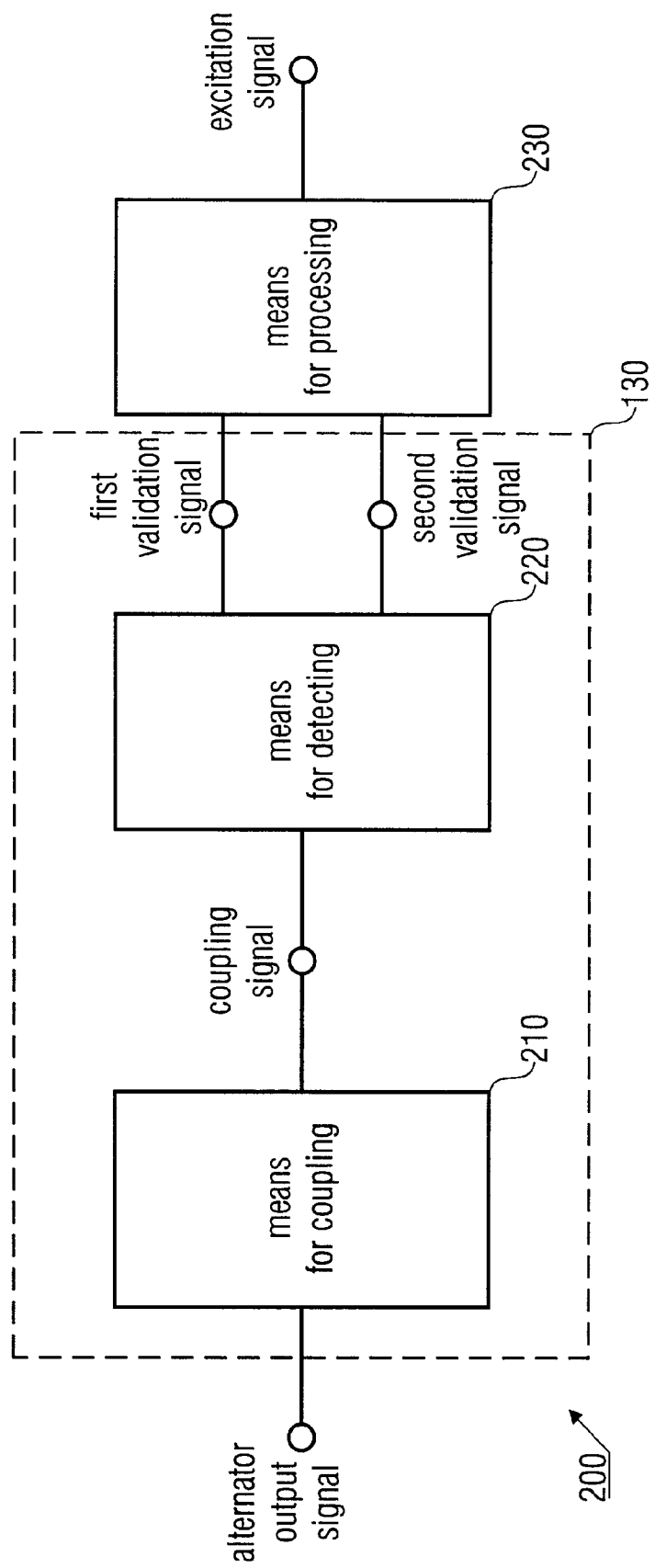
FIG. 1c depicts and embodiment of a controller circuit.

FIG. 1c shows an embodiment of a controller circuit 200 for providing a controlled excitation signal for an alternator. The controller circuit 200 comprises a circuit 210 for coupling being adapted for receiving an alternator output signal and for providing a coupling signal having information on the phase of the alternator output signal, the circuit 210 for coupling having a capacitive element for coupling the alternator output signal and the coupling signal, the circuit 210 for coupling further having a resistive element for coupling the coupling signal and a reference signal. The controller circuit 200 further comprising a circuit 220 for detecting being adapted for receiving the coupling signal and for providing a first and a second validation signal, wherein the relation between the first and the second validation signals is based on information on the phase of the output signal. The controller circuit 200 further comprises a circuit 230 for processing the first and the second validation signals and for providing the excitation signal based on the frequency of the alternator output signal, wherein the frequency of the alternator output signal is derivable from the first or second validation signals and the validity information is derivable from the relation between the first and the second validation signals.

Figure 2:
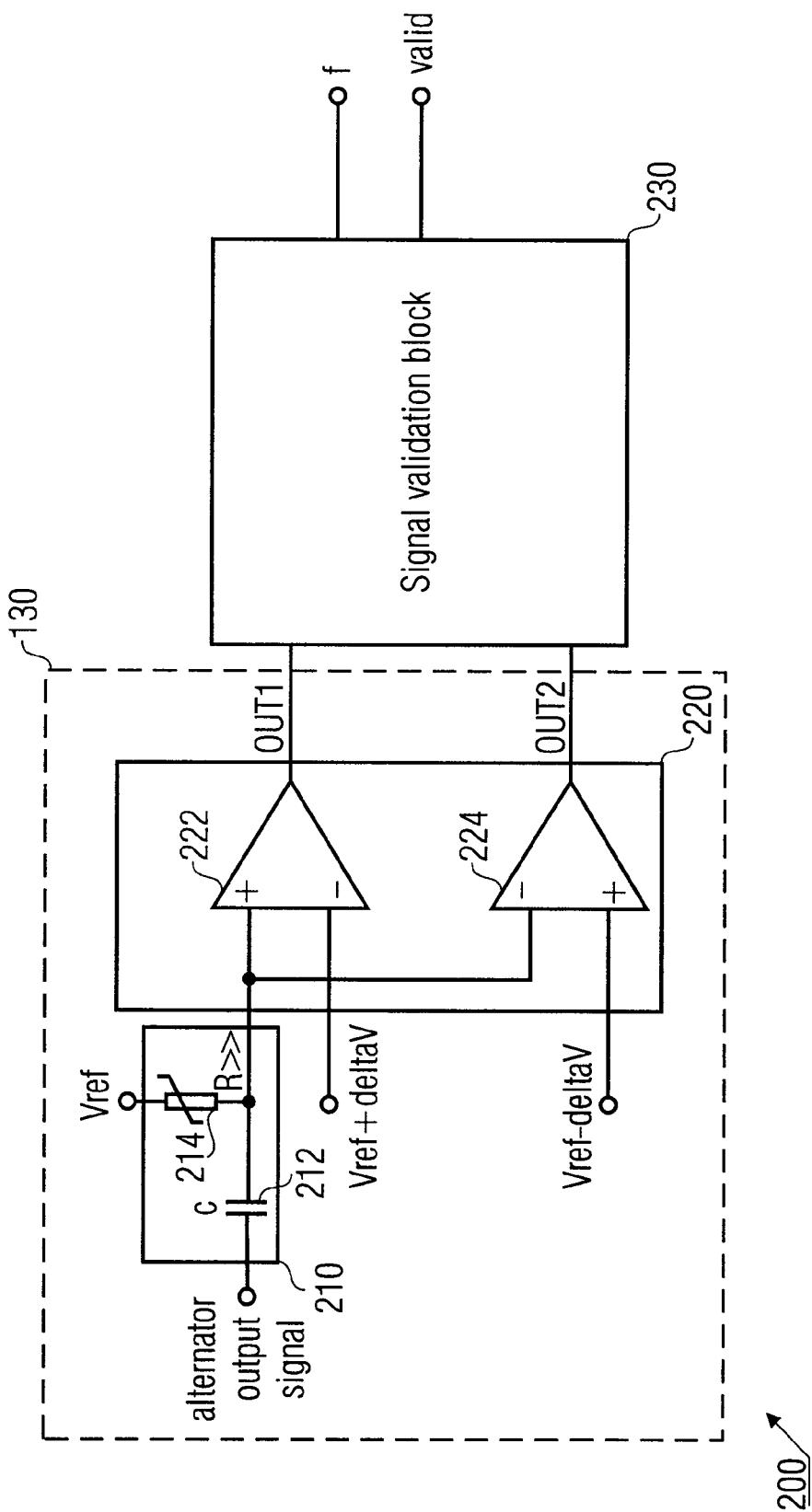
FIG. 2 shows another embodiment of an acquisition circuit.

FIG. 2 shows another embodiment of a controller circuit 200. FIG. 2 shows a circuit for coupling 210 which is realized with a capacitor 212 and a resistive element 214. An alternator output signal is coupled to the capacitor 212 and the output of the capacitor 212 is coupled through the resistive element 214 to a reference signal Vref. The output of the capacitor 212 is furthermore connected to the input of a circuit 220 for detecting, which is realized by a window comparator comprising two operational amplifiers 222 and 224, where the thresholds of the window comparator are symmetrical to the reference signal Vref±deltaV. The circuit for detecting provides two validation signals "OUT1" and "OUT2" to a circuit for processing 230, which is realized as a signal validation block 230 in FIG. 2. Through processing the two validation signals "OUT1" and "OUT2" the signal validation block 230 evaluates a frequency "f" and a validation indication "valid".

One embodiment has two major blocks, the input detection circuit, which is realized by the circuit 210 for coupling and the circuit 220 for detecting, and the circuit for processing 230 or the signal validation block. The input detection circuit fulfils the two contradictory requirements of high input resistance and well defined operation point. Embodiments determine the input resistance by the input resistance of the comparator 222 and the extremely high-ohmic resistance 214 to the reference signal or reference voltage Vref.

Figure 3:
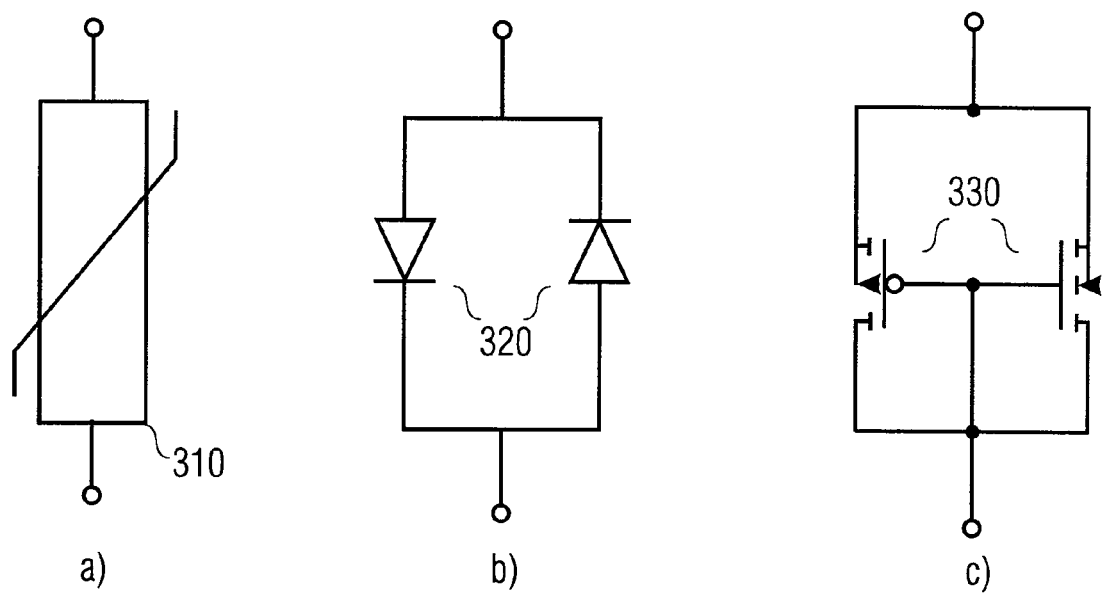
FIG. 3a-c show three embodiments of resistive elements.

The FIGS. 3a-c show three embodiments of realizations of the high-ohmic resistance. To achieve a well defined operation point, the resistance 214 can either be realized by a high-ohmic resistor 310 as shown in FIG. 3a, by two anti-parallel diodes 320 as shown in FIG. 3b, or by a transistor structure 330 as show in FIG. 3c. This leads to a small, very high-ohmic region symmetrical to the reference voltage Vref. Above and below this region the resistor 214 is low-ohmic for the cases of anti-parallel diodes 320 or the transistor structure 330. These structures 320;330 are very sensitive and enable the usage of a coupling capacitor, 212 in FIG. 2, with only about 10 pF for the implementation on a chip, which is a value being well suited for integration.

As mentioned above, in one embodiment the circuit 220 for detecting is realized by a window comparator 222;224 with symmetrical thresholds related to the reference signal or reference voltage Vref. Without any input signal, the validation signals "OUT1" and "OUT2" have a logical "0" output. Due to the fact that only sinusoidal signals are to be detected, at "OUT1" and "OUT2" a logical "1" is expected alternately. Embodiments exploit this characteristic for rejection of disturbances.

Figure 4A:
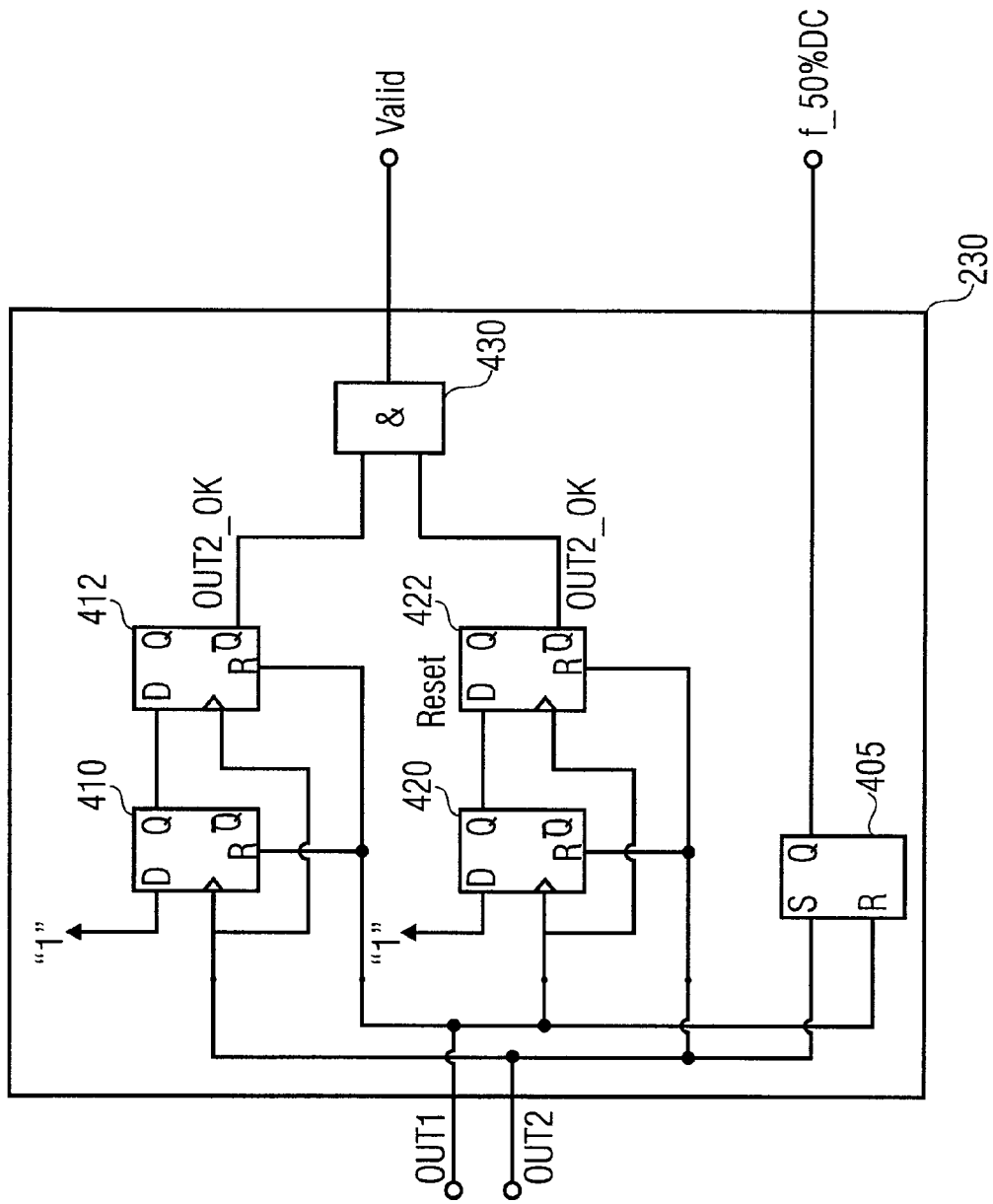
FIG. 4a shows an embodiment of a processing circuit.

FIG. 4a depicts an embodiment of the circuit 230 for processing or the signal validation block of FIG. 2. In this embodiment, the circuit for processing 230 has an output f_50% DC, which delivers a frequency signal with 50% duty cycle and which is produced from the two validation signals "OUT1" and "OUT2" by an RS-flip-flop 405 (S=set, R=reset). Generally in embodiments the circuit 230 for processing can provide a signal with a duty cycle in the range of 30-70%, in a preferred embodiment it is around 50%. In order to illustrate how the 50% duty cycle signal is produced, FIG. 4b depicts a number of view graphs of the involved signals.

FIG. 4b shows an exemplified view graph 450 of an alternator output signal. In this example it is assumed, that there is a DC part of about 4V and a sinusoidal signal with an amplitude of about 0.3V superimposed to it. The view graph 455 shows the coupling signal associated with the alternator output signal 450. Furthermore, the view graph 455 depicts the two thresholds, which are established by the window comparator. The straight line in the middle illustrates the reference signal Vref, the dotted lines above and below Vref depict the window Vref±deltaV of the window comparator. The view graph 460 depicts the associated first validation signal "OUT1". It can be observed in the view graph 460 that whenever the coupling signal exceeds the upper threshold Vref+deltaV the first validation "OUT1" has a rising edge and whenever the coupling signal undergoes the lower threshold Vref−deltaV the second validation "OUT2" as depicted in the view graph 465 has a rising edge. The falling edges of the validation signals "OUT1" and "OUT2" are determined in similar ways.

FIG. 4b furthermore depicts a view graph 470 showing the 50% duty cycle signal (DC=duty cycle) f_50% DC. The signal is determined from the two validation signals "OUT1" and "OUT2" through the RS-flip-flop 405 as it is depicted in FIG. 4a. The 50% duty cycle results from the symmetric choice of the thresholds and the sinusoidal coupling signal. From the viewgraph 470 depicted in FIG. 4b it can be seen, that whenever the first validation signal "OUT1" has a rising edge, the 50% duty cycle has a falling edge, which corresponds to the reset functionality of the RS flip-flop 405. Furthermore, it can be seen from FIG. 4b and the viewgraphs 465 and 470 that whenever the second validation signal "OUT2" has a rising edge the 50% duty cycle signal has a rising edge as well, which corresponds to the set functionality of the RS flip-flop 405.

According to an embodiment a reference signal, respectively a reference voltage is used, preferably in a range of 0-5V. In another embodiment this range may be 0.5V to the battery voltage lowered by 0.5V. By properly designing the comparators, a large voltage range is achievable. In practical implementations a range of for example 1.5V to 3.5V may be satisfactory. Lowering the range may also lower the room requirement for the comparator on a chip.

In another embodiment, the circuit 230 for processing as it is depicted in FIG. 4a may be followed by a digital signal processing part. The digital signal processing part may carry out a first check for signal robustness on the 50% duty cycle signal. An additional check for alternate occurrence of a logical "1" is done on each output of the validation signal "OUT1" and "OUT2" with two D-flip-flops 410 and 412, respectively 420 and 422. The following description refers to both signal paths in a similar way. The output of the first validation signal "OUT1" is connected to the clock inputs of the two D-flip-flops 420 and 422. The reset inputs of the D-flip-flops 420 and 422 are connected to the second validation signal "OUT2". The other two D-flip-flops 410 and 412 are connected to the two validation signals in a similar way, but with exchanged roles of the two validation signals. The D-inputs of the first flip-flops 410 and 420 are set to a logical "1", the D-inputs of the second D-flip-flops 412 and 422 are connected to the Q-outputs of the first D-flip-flops 410 and 420. The inverted outputs of the second D-flip-flops 412 and 422, which are labelled with "OUT1_OK" and "OUT2_OK" in FIG. 4a are used to generate a "valid" signal by a logical "AND" 430. For as long as the two validations signals "OUT1" and "OUT2" occur alternately, the second D-flip-flops 412 and 422 are always reset. If a disturbance occurs, the inverted outputs "OUT1_OK" and "OUT2_OK" change to "0", due to the missing reset pulse. The "valid" signal also changes to "0" and the frequency measurement in the digital path can be inhibited.

Figure 5:
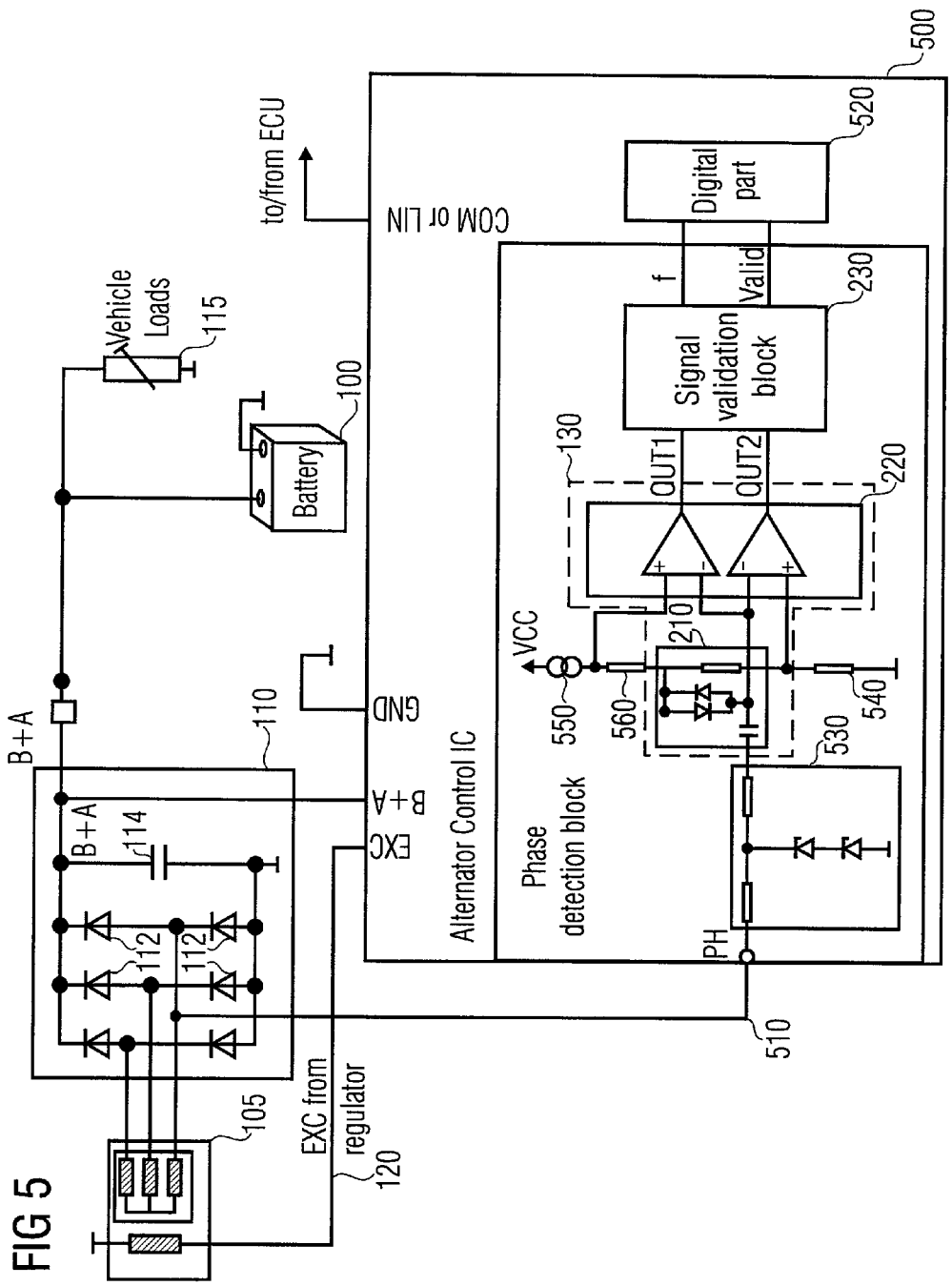
FIG. 5 shows an embodiment coupled to an alternator.

FIG. 5 shows an embodiment as it could be implemented in an alternator circuit. FIG. 5 shows all the components that were depicted and discussed according to FIG. 1a. The embodiment in the example depicted in FIG. 5 is implemented in an alternator control IC 500. The alternator control IC 500 has an input 510, which is coupled to a phase signal of the alternator 105. The output 510 is coupled to a circuit 210 for coupling the alternator output signal to a coupling signal, and the coupling signal is then followed by a circuit 220 for detecting the coupling signal, yielding the two validation signals "OUT1" and "OUT2", which are provided to a circuit for processing or the signal validation block 230. The signal validation block 230 determines frequency and validity indication for the phase signal, which are provided to a digital part 520 for further signal processing. The digital part then processes the determined frequency and validity signal and determines an excitation signal, which is then provided to the excitation output 120 of the alternator 105. In the embodiment depicted in FIG. 5, the alternator control IC 500 further comprises extra elements 530, which can also be implemented within the circuit 210 for coupling the alternator output signal. Furthermore the resistive elements 540 and 560, as well as the reference voltage source 550 can be implemented within the circuit 210 for coupling or within the circuit 220 for detecting.

In summary, embodiments utilize the benefits of capacitive coupling plus high-ohmic resistance to set an operating point. The high-ohmic connection is able to use very small capacities, for example, around 10 pF, and it is thus fully integrable on-chip, which makes embodiments very advantageous. Moreover, embodiments determine the validation of the detected signal provided by, for example, two comparators with symmetrical thresholds, that consists of the 50% duty cycle check plus the check of the alternate occurrence of the validation signals "OUT1" and "OUT2". Other embodiments utilize a single validation signal and derive only the frequency information of the phase or alternator output signal.

Depending on certain implementation requirements of the inventive methods, the inventive methods can be implemented in hardware or in software. The implementation can be performed using a digital storage medium, in particular a disc, DVD, or CD having electronic readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program runs on a computer. In other words, the inventive methods are, therefore, a computer program having a program code for performing at least one of the inventive methods when the computer program runs on a computer.

LIST OF REFERENCE SIGNS

100 Battery
105 Alternator
110 Rectification Circuit
112 Diodes
114 Capacitor
115 Vehicle Load
120 Excitation connection
122 Regulator
130 Acquisition Circuit
135 Circuit for Coupling
140 Circuit for Detecting
145 Input for Alternator Output Signal
148 Output for Coupling Signal
155 Input of Circuit for Detecting
156 Output for First Validation Signal
157 Output for Second Validation Signal
200 Controller Circuit
210 Circuit for Coupling
212 Capacitor
214 Resistive Element
220 Circuit for Detecting
222 Operational Amplifier
224 Operational Amplifier
230 Circuit for Processing
310 High-ohmic Resistor
320 Anti-Parallel Diodes
330 Transistor Structure
405 RS-Flip Flop 410 D-Flip Flop
411 D-Flip Flop
420 D-Flip Flop
421 D-Flip Flop
430 Logical "AND"
450 Alternator Output
455 Coupling Signal
460 First Validation Signal "OUT1"
465 Second Validation Signal "OUT2"
470 50% Duty Cycle f_50% DC
500 Alternator Control IC
510 Output for Alternator Output Signal
520 Digital Part
530 Extra Elements

What is claimed is:

1. Acquisition circuit for providing a first and a second validation signal based on an alternator output signal, comprising:
   a coupler with an input for receiving the alternator output signal and an output for providing a coupling signal having information on the phase of the alternator output signal, the coupler comprising a capacitive element for coupling the alternator output signal and the coupling signal, the coupler further comprising a resistive element for coupling the coupling signal and a reference signal;
   a detector with an input for receiving the coupling signal and a first and a second output for providing the first and the second validation signals, where a relation between the first and the second validation signals is based on the information on the phase of the output signal,
   wherein the first or second validation signals comprise information on the frequency of the alternator output signal and information on the validity of the first and second validation signals.

2. Acquisition circuit according to claim 1, wherein the capacitive element comprises a capacitor of a capacity of less than 10 nF.

3. An acquisition circuit of claim 1, wherein the capacitive element is coupled to an input of a comparator.

4. Acquisition circuit of claim 1, wherein the resistive element comprises a resistor with an ohmic resistance higher than 1 GΩ.

5. Acquisition circuit of claim 1, wherein the resistive element comprises a diode.

6. Acquisition circuit of claim 1, wherein the resistive element comprises two anti-parallel diodes.

7. Acquisition circuit of claim 1, wherein the resistive element comprises a transistor structure.

8. Acquisition circuit of claim 1, wherein the resistive element comprises two field effect transistors.

9. Acquisition circuit of claim 1, wherein the means for detecting comprises a comparator.

10. Acquisition circuit of claim 1, wherein the means for detecting comprises a window comparator with thresholds related to the reference signal.

11. Acquisition circuit of claim 1, wherein the means for detecting comprises a window comparator with thresholds being symmetrical and related to the reference signal.

12. Acquisition circuit of claim 1, wherein the reference signal is a DC-signal with a range of 0-5V.

13. Acquisition circuit for providing a first and a second validation signal based on an alternator output signal, comprising:
    a coupling circuit with an input for an alternator output signal and an output for a coupling signal, the input for the alternator output signal being coupled with the output for the coupling signal with a capacitor, the output for the coupling signal being further coupled to a reference signal with a resistive element; and
    a detector circuit with an input being coupled with the output for the coupling signal and with a first output for the first validation signal and a second output for the second validation signal.

14. Acquisition circuit of claim 13, wherein the capacitor has capacity of less than 10 nF.

15. Acquisition circuit of claim 13, wherein the resistive element has an ohmic resistance of more than 1 GΩ.

16. Acquisition circuit of claim 13, wherein the resistive element comprises a diode.

17. Acquisition circuit of claim 13, wherein the resistive element comprises two anti-parallel diodes.

18. Acquisition circuit of claim 13, wherein the resistive element comprises a transistor structure.

19. Acquisition circuit of claim 13, wherein the detector circuit comprises a comparator.

20. Acquisition circuit of claim 13, wherein the detector circuit comprises a window comparator with symmetrical thresholds related to the reference signal.

21. An acquisition circuit of claim 20, wherein the window comparator comprises an input for the reference signal being decreased by an offset and an input reference signal being increased by the offset.

22. Method for providing a first and a second validation signal based on an alternator output signal, comprising:
    receiving the alternator output signal at an input;
    coupling the alternator output signal and a coupling signal with a capacitive element;
    coupling the coupling signal and a reference signal with a resistive element;
    providing the first and the second validation signals, wherein a relation between the first and the second validation signals is based on information on the phase of the alternator output signal, wherein the first or second validation signals comprise information on the frequency of the alternator output signal and information on the validity of the first and the second validation signals.

* * * * *